US010113118B2

(12) United States Patent
Iversen

(10) Patent No.: US 10,113,118 B2
(45) Date of Patent: Oct. 30, 2018

(54) PROCESS AND APPARATUS FOR PRODUCING HYDROCARBON

(71) Applicant: STEEPER ENERGY APS, Hørsholm (DK)

(72) Inventor: Steen Brummerstedt Iversen, Vedbæk (DK)

(73) Assignee: STEEPER ENERGY APS, Hørsholm (DK)

( * ) Notice: Subject to any disclaimer, the term of this patent is extended or adjusted under 35 U.S.C. 154(b) by 169 days.

(21) Appl. No.: 15/107,014

(22) PCT Filed: Dec. 22, 2014

(86) PCT No.: PCT/IB2014/067212
§ 371 (c)(1),
(2) Date: Jun. 21, 2016

(87) PCT Pub. No.: WO2015/092773
PCT Pub. Date: Jun. 25, 2015

(65) Prior Publication Data
US 2016/0333273 A1    Nov. 17, 2016

(30) Foreign Application Priority Data
Dec. 21, 2013 (DK) .................................. 2013 00715

(51) Int. Cl.
*C10G 1/02* (2006.01)

(52) U.S. Cl.
CPC ........ *C10G 1/02* (2013.01); *C10G 2300/1011* (2013.01); *C10G 2300/302* (2013.01); *C10G 2300/4012* (2013.01); *Y02P 30/20* (2015.11)

(58) Field of Classification Search
CPC .............. C10G 1/00; C10G 1/02; Y02F 30/20
See application file for complete search history.

(56) References Cited

U.S. PATENT DOCUMENTS

| 2006/0260186 A1 | 11/2006 | Iversen et al. |
| 2009/0166262 A1 | 7/2009 | He et al. |
| 2009/0206007 A1 | 8/2009 | Allam |
| 2013/0212932 A1 | 8/2013 | Bell et al. |

(Continued)

FOREIGN PATENT DOCUMENTS

| DE | 3644665 A1 | 7/1988 |
| DE | 277612 A1 | 4/1990 |

(Continued)

*Primary Examiner* — Brian A McCaig
(74) *Attorney, Agent, or Firm* — Birch, Stewart, Kolasch & Birch, LLP

(57) ABSTRACT

The invention relates to a method for producing liquid hydrocarbon, the method comprising: providing a feed material, pressurizing the feed material to a predetermined process pressure, heating the pressurized feed material to a predetermined process temperature, reacting the pressurized and heated feed material for a predetermined period of time, cooling the reacted feed material and mechanically separating a high viscosity fraction from the converted feed material before conveying the remaining converted feed mass through a pressure reduction system and further through a separation system.

17 Claims, 5 Drawing Sheets

(56) References Cited

U.S. PATENT DOCUMENTS

2014/0005444 A1* 1/2014 Komplin ............... C07C 29/132
568/861
2014/0031599 A1* 1/2014 Komplin ................... B01J 8/04
585/240

FOREIGN PATENT DOCUMENTS

| WO | WO 2006/117002 A2 | 11/2006 |
| WO | WO 2008/038854 A1 | 4/2008 |
| WO | WO 2009/085700 A2 | 7/2009 |
| WO | WO 2012/167794 A2 | 12/2012 |

* cited by examiner

PROCESS AND APPARATUS FOR PRODUCING HYDROCARBON

FIELD OF THE INVENTION

The invention relates to the area of hydrocarbon production, more specifically to the area of hydrocarbon production through conversion of biological material through a hydrothermal liquefaction process.

BACKGROUND OF THE INVENTION

The world is facing fluctuations in crude oil prices as well as challenges to energy security, economic stability and growth. Further environmental concerns related to climate change due to the 'greenhouse effect' are coming more and more in focus. Furthermore, a number of conventional energy sources such as oil are being depleted. This calls for a more efficient and sustainable use of resources, including non-conventional and alternative resources.

Hence, there is a large and increasing global interest in new technologies for the production of liquid hydrocarbons from low value abundant resources such as lignite, peat, biomass, residues and waste. A general characteristic of such low value resources is that they typically have high moisture content, an oxygen content on a dry ash free basis in the range 20-60%, and an ash content ranging from a few percent to more than 50% by weight, which results in a low heating value as received.

Technologies for production of nonconventional liquid hydrocarbons are known, e.g. production of liquid hydrocarbons from coal has been known for more than 150 years. Pyrolysis or high temperature carbonization is another well-known route for production of liquid hydrocarbons from solid fuel. Depending on the specific process, the input stream may be heated to a temperature in the range 450 to 1000° C. in the absence of oxygen, drying of the volatile compounds and leaving a coke product. The hydrocarbon yields can be wide varying and ranges from 10 to 75% depending on the volatile content of the specific input streams and process conditions. In general fast heating (fast pyrolysis) and short residence time provides the highest yields. However, pyrolysis is limited to dry input streams, e.g. moisture contents up to approximately 10% by weight. Further, as only very limited conversion of the liquid hydrocarbon produced occurs during processing, the liquid hydrocarbons produced have a high oxygen and water content, and the liquid hydrocarbons produced consequently have a low heating value. Further, the liquid hydrocarbons are not mixable with petrodiesel and petrocrude, and are corrosive and susceptible to polymerization which makes long term storage difficult. This limits the direct use of such pyrolytic hydrocarbon liquids. Upgrading of pyrolytic hydrocarbons may be performed by hydrodeoxygenation or by addition of hydrogen during the pyrolysis process. However, though such hydrogenation processes are technically feasible, they will add significantly to the production costs as no oxygen is removed by the pyrolysis, and production of hydrogen is relatively expensive.

The production of liquid hydrocarbons from feedstock other than coal is also being conducted by the pyrolysis, as well as by indirect and direct liquefaction techniques described above. However, common for them are that they all require relatively dry input streams. A fundamental issue is difference in the stoichiometry of the input stream and liquid hydrocarbon fuels. For example dry wood may be represented by the formula $CH_{1.4}O_{0.7}$, whereas liquid hydrocarbon fuels may be represented by the formula $CH_2$:

$$CH_{1.4}O_{0.2} \rightarrow CH_2$$

This fundamentally results in an indispensable need for hydrogen addition and/or removal of carbon during the processing for adaption of the H/C ratio and removal of oxygen. Removal of carbon as char and $CO_2$ reduces the maximum obtainable yields of the desired hydrocarbons, whereas production of hydrogen is relatively expensive and adds significantly to the complexity and reduces the efficiency of such processes. Hence, to be viable such processes require a very large scale and thereby become very capital intensive (UK DTI, Coal Liquefaction, Cleaner Coal Programme, Technology Status Report 010, October 1999).

Hence, there is a large interest in developing improved production techniques for liquid hydrocarbons not suffering from the drawbacks described above. Conversion of the feedstock in pressurized water at elevated temperatures is a route which has attracted significant attention over recent decades. Such techniques are generally called hydrothermal processing, and generally convert the feedstock into a liquid hydrocarbon product, a char product, a water phase comprising water soluble organics, a gas and a mineral product.

An advantage of hydrothermal processing is that water is kept under pressure so that it is maintained in its liquid and/or supercritical state which means that no phase transition into steam occurs during processing. Hence, the energy loss, in the form of latent heat of evaporation, need not be supplied, and thus energy consuming processes such as evaporation or distillation are eliminated. This renders such processes very energy efficient particularly for wet input streams.

Water, in the vicinity of its critical point (374° C., 221 bar) obtains physical properties which are very different from water at ambient conditions, e.g. the dissociation product of water is more than three orders of magnitude higher, it changes its polarity from a polar solvent to a non-polar solvent, interphase mass and heat transfer resistances are significantly reduced and mass and heat transfer rates are therefore enhanced.

Due to these properties of water in the vicinity of its critical point, water may serve both as a reaction medium, a catalyst for acid and base catalyzed reactions and as a reactant and source of hydrogen in the conversion process.

Hence, hydrothermal processing holds the potential to reduce the oxygen content of wet oxygenated feedstock with lower parasitic energy losses and with less hydrogen required due to formation of hydrogen in situ.

Deoxygenation goes through dehydration, decarboxylation and hydrogenation reactions. However, the reaction pathways are complex and are to a large extent unknown except for simple molecules. Carbonaceous macromolecules may undergo various reactions including hydrolysis, dehydration, decarboxylation, steam reforming, water gas shift, steam cracking, Bouduard reaction, hydrogenation, methanation, Fischer-Tropsch, aldol condensation, esterification, methanol synthesis etc. The rate of the individual reactions and the extent to which conversion proceeds via specific reaction pathways depend on a number of factors.

Processes differ in the specific operating conditions and process design and layout being applied, e.g. the feedstock, the dry solid content in the feed, the ash content of the feed, the operating pressure and temperature, the pH, the catalysts and other additives present in different parts of the process, the residence time in the different parts of the process, the heat integration, the separation techniques applied including further product handling and upgrading etc.

Despite the fact that hydrothermal technologies have many potential benefits over conventional methods of processing biomass and other organic macromolecules into useful fuels and chemicals, the fact remains that these technologies have yet not been widely commercialized (A. Peterson et al, 2008).

An improved process and apparatus for production of liquid hydrocarbons as the main product and not suffering from the problems and disadvantages described above is disclosed by Iversen in PCT/DK2012/000071.

One of the challenges of the previously known methods is the relatively high energy consumption for separating different fractions of the produced hydrocarbon, with the purpose of producing different types of end products. In traditional methods this is done by heating the hydrocarbon produced and successively separating the components according to the condensation points of the various fractions.

The known method for separating different fractions of the hydrocarbon is functioning well and has a high relevance for traditionally produced hydrocarbons, e.g. fossil hydrocarbons produced from sub terrain well or from terrain level oil sand reservoirs. The method is however requiring a significant energy input and hence increases the cost of producing the desired hydrocarbons.

Therefore it would be advantageous to provide a new method and corresponding device through which the total energy consumption of the process would be reduced and hence provide increased environmentally friendly hydrocarbon products, in particular when applied in a conversion process for producing hydrocarbons from biological material.

SUMMARY OF THE INVENTION

In one aspect of the present invention the objective is to provide a method that will reduce the overall energy requirement for producing lower viscosity hydrocarbon products and increase the direct usability of the lower viscosity hydrocarbon product.

According to the invention this objective is achieved through a method for producing liquid hydrocarbon by converting carbonaceous material contained in one or more feedstocks, the method comprising providing a feed material from one or more feedstocks, pressurizing the feed material to a predetermined process pressure of at least 150 bar, heating the pressurized feed material to a predetermined process temperature of at least 370° C., reacting the pressurized and heated feed material for a predetermined period of time, cooling the reacted feed material to a temperature below 200° C., mechanically separating a higher viscosity fraction from the converted feed material at operational pressure, conveying the remaining converted feed mass through a pressure reduction system and further through a separation system.

By providing a mechanical separation step prior to the pressure reduction it will be possible to separate the output of the conversion process in a high viscosity fraction and a low viscosity fraction. By doing so the lighter fraction that passes through the separation step may for many applications have a sufficient quality to be used directly without further refining or upgrading. Even if further refining or upgrading is needed the required energy input will be significantly reduced compared to the hitherto known solution, as the most energy demanding higher boiling point components have already been removed. The fraction having passed the filter will thus have a content of much lower viscosity or lower boiling hydrocarbons, which may have suitable characteristics for many direct use purposes. The higher content of much lower viscosity hydrocarbons may further result in an easier downstream processing, e.g. provide an easier and/or improved separation of the liquids hydrocarbon product from the converted biomass stream.

As a further consequence of the mechanical filtration of the higher viscosity fraction a reduction of particles such as ash and char in the lower viscosity will be observed. Further a reduction of the sulfur content and/or a lower density may be observed in the lower viscosity fraction. Hence, the mechanical separation according to the present invention results in an overall improvement of the quality of the liquid hydrocarbon product in the low viscosity fraction.

Preferably the mechanically separated high viscosity fraction is extracted from the process.

The mechanically separated and successively extracted high viscosity fraction may be treated further, e.g. in a separate process, or may form part of a feed mixture to be fed into the process.

Advantageously the extraction is performed through altering mechanical filters between at least one online and at least one offline filter. Hereby the online filter is opened for inflow and the offline filter is closed for inflow by opening and closing, respectively, system valves upstream and downstream of the filter. The offline mechanical filter is cleaned by opening a drain valve located between the closed system valves on the dirty side of the filter, towards a lower pressure area, e.g. the surrounding atmospheric pressure, in order to release the mechanically separated high viscosity fraction from the filter and through the drain valve. After release of the pressure the filter may be further cleaned by flushing with a suitable fluid at a temperature that makes the high viscosity fluid flow, e.g. steam, preferably pressurized steam.

Advantageously the temperature of the mechanical filter(s) is controlled to be in the range 40° C. to 200° C., preferably in the range 40° C. to 150° C., most preferred in the range 50° C. to 120° C. such as in the range 60° C. to 100° C. Hereby the higher temperature is chosen to selectively solidify high viscosity compounds and the lower temperature is chosen to allow a lower viscosity fraction to permeate at a sufficiently high temperature for the successive separation and possibly further processing.

After the extraction of the built up higher viscosity fluid the drain valve is closed and the chamber is filled with an essentially incompressible fluid, e.g. pressurized steam, prior to pressurizing the filter chamber through opening the system valves. This pre-pressurizing of the filter is important in order to avoid pressure fluctuations and hence vibrations in the system.

In another aspect of the present invention the objective is to provide a production equipment that will reduce the overall energy requirement for producing lower viscosity hydrocarbon products.

According to the invention this objective is achieved through a device for carrying out the method according to the previous claims, where the device comprises: A pressurization device adapted for pressurizing a feed mixture; A heating device adapted for heating the pressurized feed mixture; A conversion tank adapted for holding the pressurized and heated feed mixture for a predetermined process time; A cooling device adapted for at least partly cooling the processed feed mixture; A mechanical filter device adapted for separating a higher viscosity fraction from the processed feed mixture and allowing a lower viscosity fraction to pass through the filter device; A pressure reduction device adapted for at least partly lowering the pressure of the processed feed mixture having passed through the mechanical filter device and a separation device for separating the components of the processed feed mixture passed through the mechanical filter device.

Preferably the mechanical filter device is a filter with filter openings ranging between 1 µm and 1 mm, preferably between 1 µm and 500 µm and even more preferably between 10 µm and 250 µm.

Advantageously system valves are located on upstream and downstream sides of the mechanical filter device. Further, a drain valve is located between the system valves, and upstream the filter element on the dirty or clogged side of the filter element.

At least one fluid supply valve is located between the system valves and adapted to allow inflow of a fluid when the system valves and the drain valve are closed. The fluid supply valve may be located downstream the separation device. A relieve valve or opening may be provided for allowing complete filling of the filter cavity surrounding the filter, i.e. the gas present in the filter cavity between the system valves will be allowed a possibility to escape upon supplying the filling fluid.

An inlet for a flushing liquid or gas may be provided, preferably downstream the filter, allowing for flushing the filter during offline status and with the drain valve open towards the lower pressure area.

The invention will in the following description of a preferred embodiment be described in more detail, with reference to the attached drawings, where:

DESCRIPTION OF PREFERRED EMBODIMENT

Pretreatment

Figure 1:
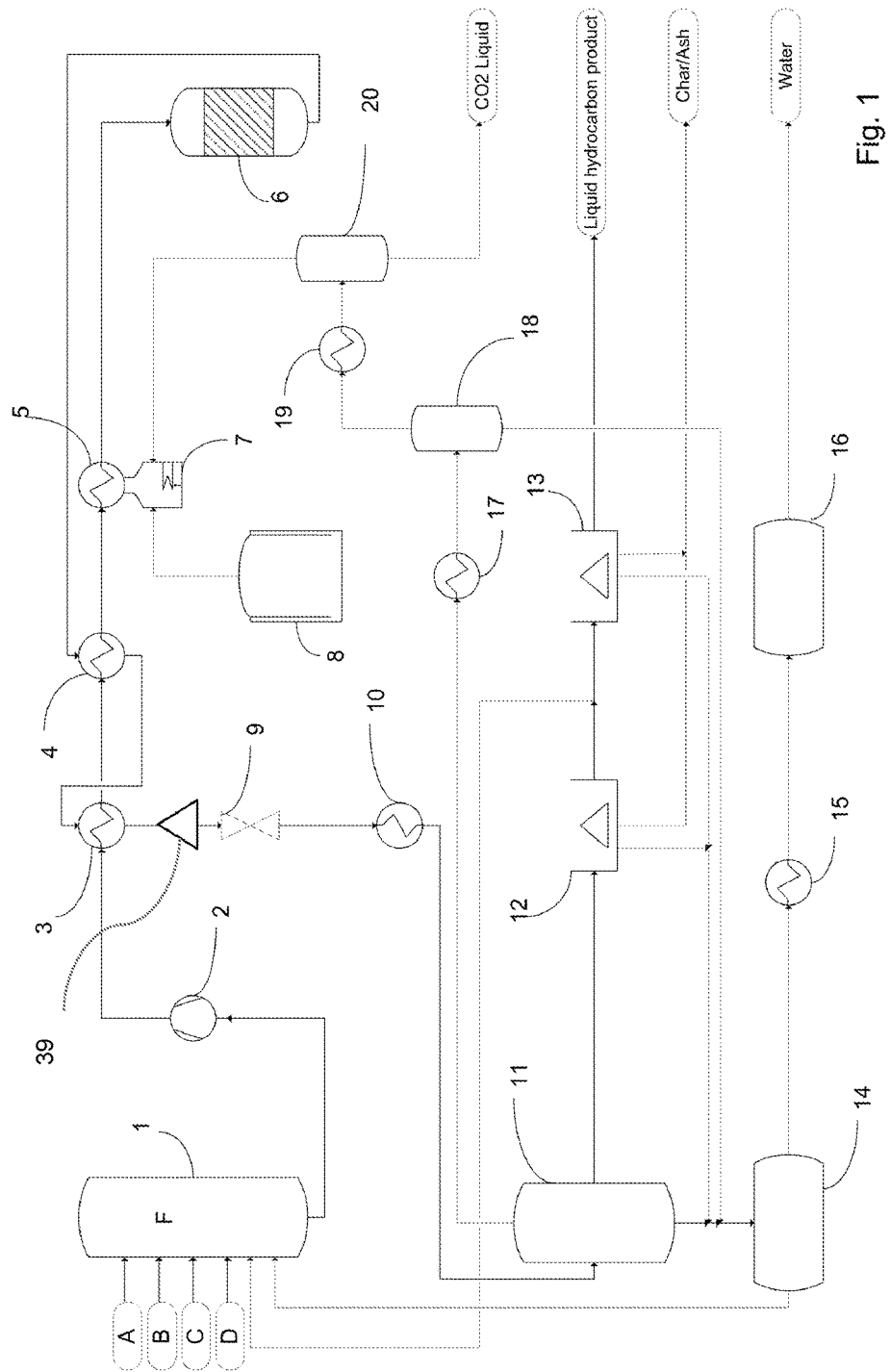
FIG. 1 shows a schematic embodiment of a production line for producing liquid hydrocarbon.

Carbonaceous material contained in one or more input streams A,B are introduced into a pretreatment step in pretreatment device 1, where they are transformed into a homogeneous, pumpable feed mixture in the form of a slurry and/or paste F. This may be performed e.g. by introducing in situ produced liquid hydrocarbon compounds such as a recycle stream of the liquid hydrocarbon product produced or a fraction of the same as indicated by the fluid stream from the pipeline after the first separation and into the pretreatment device 1 and/or recovered liquid organic compounds and/or homogeneous catalysts from the water phase as indicated by the fluid stream from 14 into the pretreatment device 1. Depending on the concentration of the homogeneous catalysts such as potassium and/or sodium in the input stream(-s) make-up catalysts C may also be introduced to adjust the catalyst concentration to the concentration according to the present invention. Said catalyst may according to a preferred embodiment of the present invention be added as a salt or be dissolved in a liquid, e.g. water. Often said make-up catalyst(s) C according to the present invention will be in an alkaline form such as in a hydroxide or carbonate form, and may besides make-up of the homogeneous catalyst concentration further serve as a pH adjustment of the feed mixture F so as to obtain a pH of at least 7 during or after said conversion, preferably a pH in the range 8-12 and more preferably a pH in the range 8-11. In many embodiments according to the present invention, the pH of the feed mixture during and/or after said conversion of carbonaceous material contained in said feed mixture F is controlled by measuring the pH during and/or after said conversion and adjusting the pH in said feed handling 1 by addition of make-up catalyst and/or alternatively adding another base D to said feed handling 1.

Typically the weight ratio of said recycled stream(-s) comprising liquid organic compounds relative to said input streams being introduced into said feed handling according to the present invention is in the range 0.01 to 5.0, such as in the range 0.1 to 5.0, preferably in the range 0.2 to 3.0 such as in the range 0.4 to 2, and even more preferably in the range 0.5-1.5. Besides introducing process advantages from a conversion point of view, the recovery and recycle of in situ produced liquid organic compounds to the pretreatment 1 enables preparation of a feed mixture comprising homogeneous pumpable slurry or paste F from the input streams as received and/or preparation of a feed mixture comprising a pumpable slurry or paste F having a higher dry matter content as no or less water and/or other solvent needs to be added to said pretreatment 1. It has further been found that presence of said liquid organic compounds during said pretreatment 1 introduces a stabilizing and/or dissolution effect that assists in homogenizing the feed mixture F, e.g. by decreasing the viscosity of said feed mixture at a given dry solid content and temperature, or allows for operation of a higher maximum particle size and/or at higher dry matter contents and thereby results in an overall more economical and effective process, e.g. less parasitic energy losses and more oil produced.

The pretreatment 1 may according to a preferred embodiment of the present invention further comprise providing a feed mixture F with a maximum particle size of maximum 30 mm such as a particle size of maximum 15 mm, preferably said feed mixture provided has a particle size of maximum 5 mm such as a particle size of maximum 2 mm, more preferably the maximum particle size in said feed mixture is in the range 0.01 to 1.5 mm such as 0.1 to 1.0 mm. Said providing may comprise controlling the maximum particle size of the input materials, e.g. by dividing said input materials A, B by a sieving operation and/or one or more crushing and/or grinding and/or milling and/or cutting operations (not shown) and/or by dividing said feed mixture F before being withdrawn from said pretreatment to the pressurization step.

The pretreatment 1 according to a preferred embodiment according to the present invention further comprises means for thoroughly mixing and transforming said input stream(-s) and fluid streams A, B, C, D into a homogeneous slurry or paste. Said mixer may according to the present invention be a stirred vessel equipped with means for efficiently mixing and homogenizing viscous materials such as a planetary mixer, Kneader or Banbury mixer. Other preferred means for thoroughly mixing and homogenizing said input and fluid streams to a feed mixture according to the present invention include inline mixers. Such inline mixers may further introduce a cutting and/or scissoring and/or self-cleaning action. The mixer is preferably further equipped with means for heating said feed mixture to a temperature in the range 40 to 200° C., preferably in the range 40 to 180° C. and more preferably in the range 40 to 160° C. at sufficient pressure to avoid boiling such as a pressure in the range 1-20 bars, preferably in the range 1-12 bars. Preferred means for heating said feed mixture during the pretreatment according to the present invention include a heating jacket (not shown). In a preferred embodiment the heat for preheating said feed mixture F in the pretreatment 1 is obtained from the cooling of the converted carbonaceous material comprising liquid hydrocarbon product, e.g. by heat exchange with this process stream. Hereby the energy efficiency of the process may be further enhanced.

According to a preferred embodiment of the present invention, the mixer may further be equipped with a re-circulation loop (not shown), where material is withdrawn from said mixer and at least partly re-circulated in an internal or external loop and re-introduced into said pretreatment so as to control the residence time in said pretreatment or feed handling to a predefined time. Preferred residence times in said pretreatment step 1 are according to the present invention in the range 1 minute to 24 hours such as in the range 5 minutes to 12 hours. Preferably the residence time is in the range 5 minutes to 6 hours, more preferably in the range 10 minutes to 3 hours.

Typically the dry matter content according to the present invention is in the range 20 to 70% by weight, preferably in the range 25 to 60% and more preferably in the range 30 to 50% by weight.

The process according to the present invention requires water to be present in said feed mixture. Typically the water content in said feed mixture is at least 30% by weight in the range 30 to 80% by weight and preferably in the range 30 to 70%.

The mechanical and/or thermal and/or chemical pulping of the input materials obtained in said pretreatment 1 according to a preferred embodiment of the present invention enables the production of a homogeneous pumpable feed mixture F premixed with additives for performing a process according to the present invention and having a high dry matter content at a viscosity processable by a process according to the present invention. The feed mixture according to the present invention results in a more effective and economical process than in the prior art, e.g. less parasitic energy losses and higher oil yields.

Conversion

The feed mixture F is being withdrawn from said feed handling 1 and transferred to the pressurization pump 2, preferably by a positive displacement pump such as an auger or lobe pump. According to the present invention said pressurization to the desired reaction pressure is essentially performed before heating from entry temperature from the pretreatment 1 to the reaction temperature is initiated. Preferred pumps for said pressurization according to the present invention include rotary lobe pumps in a series arrangement, single or double acting piston pumps and hose diaphragm piston pumps.

The pressurization is preferably performed prior to heating, and the feed mixture is generally pressurized to a sufficiently high pressure to maintain the feed mixture and/or converted feed mixture in a liquid and/or supercritical state during said heating and conversion, i.e. the feed mixture is pressurized to a pressure of at least the saturation pressure at the prevailing temperature in the process.

Typically the feed mixture may be pressurized to an operating pressure during said heating and conversion of at least 150 bars such as 180 bars, preferably said operating pressure is at least 200 bars such as 221 bars and more preferably said operating pressure during conversion is at least 250 bar such as a pressure in the range 300 to 400 bars.

The pressurized feed mixture is subsequently heated to a reaction temperature in the range 300 to 500° C. such as in the range 350 to 450° C., preferably in the range 370 to 450° C. such as in the range 385 to 430° C., more preferred in the range 390 to 430° C. such as in the range 400 to 430° C.

According to a preferred embodiment of the present invention said heating is performed in one or more heat exchangers 3, 4, 5. Preferably said heating is at least partly performed by recovery of heat from one or more process streams. In the preferred embodiment shown in the figure, heat is recovered from the hot product stream, from the reactor 6 and transferred to the pressurized feed mixture by direct heat exchange in the first heat exchangers 3 and 4. Typically the feed mixture F is heated from entry temperature to a temperature in the range 180-250° C. in the first heat exchanger 3, and to a temperature in the range 300-390° C. in the second heat exchanger 4. In an optional embodiment said heat recovery may be performed by indirect heat exchange with a heat transfer medium such as steam, hot oil or a molten salt. By said heat recovery it is obtained that the process becomes very energy efficient as most of the heat required is recovered.

The heat exchangers 3 and 4 may optionally be combined into one heat exchanger. However, as the properties of the feed mixture, e.g. the viscosity, change significantly during said heating, it is typically preferred to divide said heating into two or more heat exchangers. This further has the advantage that different materials of construction may be used in the heat exchangers, e.g. a lower alloyed material may be used in the first heat exchanger 3. Further, according to a preferred embodiment of the present invention said heat exchangers are designed to provide a relatively high heating rate in the temperature range up to 300° C. or thereabout. Typically the heating rate in the range from 140 to 300° C. is at least 50° C./min, preferably at least 75° C./min, more preferred at least 100° C./min and even more preferred at least 150° C./min. In combination with the characteristics of the feed mixture according to the present invention it is hereby obtained that undesired side reactions to char and tar is minimized, and that the yield of desired liquid hydrocarbon product is maximized.

The feed mixture F is further heated to reaction temperature in the heat exchanger 5. Said heater may be a fired heater 7 as shown in the figure, e.g. a heater fueled by e.g. natural gas, oil or other suitable fuel 8. Preferably said fired heater is at least partly fueled by a product produced by the process according to the present invention such as gas produced by the process as shown in the figure. Other potential products produced by the process for at least partly fueling said fired heater may include char and liquid hydrocarbon product. By at least partly fueling said fired heater by a product produced, the parasitic energy loss is reduced and the energy efficiency is increased. Hereby a process that uses less consumables, is more economical and more energy efficient and having a smaller environmental and/or $CO_2$ footprint is obtained.

Alternative embodiments of the further heating to the reaction temperature according to the present invention include a fired heater with indirect heating, e.g. where heat from the combustion fuel(-s) in said furnace or burner is first transferred to another heat transfer medium such as steam, hot oil or molten salt before heat exchange with said partly heated feed stream.

Subsequent to heating to reaction temperature said pressurized and heated feed mixture F is maintained at the desired pressure and temperature in a reaction zone 6 for a predefined time. The feed characteristics and/or the combination of pressure and temperature according to the present invention generally allow for shorter reaction times and/or a more reacted liquid hydrocarbon product than in the prior art without sacrificing the yield and/or quality of the desired product. The predefined time in said reaction zone may according to an embodiment of the present invention be in the range 1 to 60 minutes such as 1 to 45 minutes, preferably said predefined time in said reaction zone is in the range 2 to 40 minutes such as in the range 1 to 30 minutes, more preferred in the range 3 to 25 minutes such as 5 to 20 minutes.

A reaction zone 6 according to the present invention advantageously comprises one or more reactors, preferably vertically oriented, wherein said feed mixture is fed to the top of said reactor(-s) in the same direction as the gravity and withdrawn from the bottom. Preferably said conversion reactors further comprise a conically shaped inlet for introducing said feed mixture in the top and a conically shaped outlet for withdrawing said converted feed mixture F in the bottom. Advantageously said conically shaped inlet has an angle of the walls of said conically shaped inlet to the centerline of said reactor below 60°, and said conically shaped outlet has an angle of the walls of said conically shaped outlet to the centerline of said reactor below 30°.

Further, the diameters of inlet and outlet of reactor 6 to the maximum diameter of the reactor are preferably selected so as to obtain a minimum ratio of the maximum average velocity in inlet/outlet to the minimum average velocity in the reactor of at least 4. Preferably the ratio of the maximum average velocity in the inlet/outlet to the minimum average velocity in the reactor is selected so as to obtain a ratio of velocities of at least 16, more preferred the maximum average velocity in the inlet/outlet to the minimum average velocity in the reactor is selected so as to obtain a velocity ratio of at least 25 such as a at velocity ratio of at least 50.

Hereby an advantageous reactor system is provided that is less sensitive to clogging due to sedimentation of suspended particles, and is more compact and economically attractive than in the prior art. Further, the controlled decrease and increase of velocities in the inlet and outlet may allow for a more efficient use of the reactor volume.

Cooling and Expanding

The outlet stream from the reactor 6 comprising liquid hydrocarbon product from said converted carbonaceous material is subsequently cooled by heat exchange with the incoming feed mixture F in the heat exchangers 3,4. Often it is cooled to a temperature in the range 240-300° C. in the heat exchanger 4 and further to a temperature in the range 40-200° C. in the heat exchanger 3 and optionally by heat exchange in said pretreatment/or feed handling step as described above, before expanding the converted feed mixture containing liquid hydrocarbon product to a pressure in the range 1-70 bars in one or more expansion steps 9. A further cooler 10 may be provided.

Mechanical Separation

In connection with the cooling and expansion process steps a mechanical separation of a heavier fraction or higher viscosity fraction of the converted biomass and/or ash particles takes place. The separation will take place by use of a filter, and the specific characteristics of the retained fraction and the fraction passing the filter will depend on filter operating conditions as well as the filter characteristics.

The operating temperature of said filter is preferably controlled to a specific temperature so as to enable a controlled solidification of at least some of the high viscosity compounds of the converted biomass, thereby enabling a controlled retention of compounds resulting in higher viscosity of said liquid hydrocarbon product than without filtering. The compounds having the highest boiling point will typically also solidify first. The higher boiling or the high viscosity fraction may also comprise higher concentrations of impurities such a higher residual sulfur concentration and/or a higher residual oxygen concentration and/or have higher density and/or have a higher molecular weight and/or have a higher aromatic content than the lower viscosity lower boiling point fraction. Hence, by controlling the temperature of the mechanical filter device a fractionation of the converted biomass or liquid hydrocarbon product can be obtained.

The upper temperature is according to the invention typically selected so as to selectively solidify high viscosity compounds so as to retain them in the filter, whereas the lower temperature is selected high enough so as to maintain the lower viscosity product permeate at a sufficiently high temperature for downstream processing and so as to avoid a too high pressure drop over the filter and so to maintain an effective cleaning of the filter. In a preferred embodiment according to the present invention the operating temperature of the filter is controlled to be in the range 40 to 200° C., preferably in the range 50 to 175° C. and most preferably in the range 60 to 150° C. such as in the range 65 to 130° C.

In order to extract the filtered high viscosity fraction, a possibility for closing of the inflow to the mechanical filter as well as the outflow from the mechanical filter may be provided in the form of valves. A valve for opening an access to an exit opening on the upstream side of the filter element will be provided in order to clean the filter. A lower pressure will normally exist in the exit area, whereby the higher pressure in the filter area will drive the filtered high viscosity fraction towards the exit opening and out of the system.

A further processing of the filtered high viscosity fraction now extracted from the system may be provided. A further cleaning of the extracted fraction and a separation of the extracted fraction into two or more different viscosity or density fractions may also be provided.

The fraction having passed the filter will thus have a content of much lower viscosity or lower boiling hydrocarbons, which may have suitable characteristics for many direct use purposes. The higher content of much lower viscosity hydrocarbons may further result in an easier downstream processing e.g. provide an easier and/or improved separation of the liquid hydrocarbon product from the converted biomass stream.

A further refining or upgrading is however an opportunity, which may be performed with a significantly reduced energy input as the most energy requiring parts of the output already have been removed mechanically.

When the filter has been emptied the filter may be further cleaned through a flushing process. Having completed the emptying process, the valve towards the low pressure area is closed and the filter chamber surrounding the chamber is filled with water or another liquid. The purpose of the liquid is to reduce pressure fluctuations when opening the valves towards the pressurized process line, which would occur in case a compressible fluid, such as a gas, was present in the chamber. After opening the valves towards the process line the valves upstream and downstream another filter may be closed for cleaning of such further filter. In principle any number of filters may be provided and these may be operated individually to establish a process that runs without significant fluctuations in the operational conditions. The pressure reduction unit following the mechanical separation may be of any kind, however for this schematic presentation a pressure reduction using a flow resistance principle is used, where the processed and filtered material flows through a number of tubular elements to finally reach a desired final pressure level.

Separation

The mixture from said expanding containing liquid hydrocarbon product is subsequently led to separation. Said separation may according to the present invention comprise means 11 for separating gas from said mixture as shown in the figure. Said separation means may comprise a flash separator or degasser 11, wherein gas is withdrawn from the top. According to an embodiment of the present invention said gas may be used to produce heat for heating the process as shown in the figure and further described above. The gas may optionally be cooled to condense compounds such as e.g. water prior to said use to produce heat for heating in the process.

The gas separating means 11 may further provide at least a coarse separation of the degassed mixture into a liquid hydrocarbon rich stream and residual water rich stream, e.g. by gravimetric separation. The water rich stream comprising water soluble organics, some suspended fine particles and dissolved salts may be at least partly withdrawn from said gravimetric separator, and fed to a recovery unit, optionally after further separation by filtering and/or centrifugation (not shown) to remove suspended particles.

The degassed mixture, or optionally the liquid hydrocarbon rich stream, is withdrawn from said gas separating means 11, and may according to a preferred embodiment be further separated by centrifugation 12,13. Said centrifugation 12,13 preferably comprises one or more 3-phase centrifuges such as one or more high speed disc bowl centrifuges and/or one or more decanter centrifuges 12,13, separating the degassed mixture into a water phase containing water soluble organics and dissolved salts, an oil phase and a sludge phase comprising suspended fine particles. The first centrifuge 12 is preferably a concentrator designed for producing a water phase substantially free of liquid hydrocarbon product, a liquid hydrocarbon product comprising some water and a sludge phase comprising suspended ash and/or char particles. The water phase is fed to the recovery unit 14. The liquid hydrocarbon product is fed to the second centrifuge 13 for further separation of water and ash and/or char. Preferably the liquid hydrocarbon product after said first centrifuge is being divided prior to entering said second centrifuge 13. Preferably a fraction of said liquid hydrocarbon product produced is recycled to said pretreatment step 1.

The second centrifuge 13 is preferably a high speed disc bowl centrifuge designed as an oil purifier, i.e. suitable for producing a liquid hydrocarbon product substantially free of water. Water from the second centrifuge 13 is preferably mixed with water from the first centrifuge 12 and fed to the recovery unit 14. Similarly, ash and/or char from the second centrifuge 13 is mixed with ash and/or char from the first centrifugation 12, dried (not shown) and send to storage.

For effective separation the centrifuges 12,13 according to an embodiment of the present invention is preferably operated at a temperature in the range 50 to 200° C. such as a temperature in the range 70 to 150° C. The pressure during said separation by centrifugation is maintained at a pressure sufficiently high to avoid boiling at the prevailing temperature, e.g. a pressure of up to 15 bar, preferably a pressure up to 10 bar, more preferred a pressure up to 5 bar.

Recovery

The water phases from the gas separating means 11, centrifuges 12 and 13 are fed to a recovery device 14, where liquid organic compounds and/or homogeneous catalysts are recovered in a concentrated form, and recycled into the pretreatment device 1.

Preferably said recovery device 14 comprises an evaporation step, wherein said water is evaporated from said combined water phases, and thereby providing a distillate and a concentrate. The combined water phases may be preheated to a temperature of e.g. 70-95° C. before entering into said evaporator. The heat for said preheating is preferably provided by heat recovery from a process stream and/or from the outgoing distillate stream before entering into the evaporator.

In the evaporator, water is evaporated from said mixture comprising water soluble organics and dissolved salts at a temperature of 100 to 105° C. A preferred embodiment of said evaporator according to the present invention includes increasing the condensation temperature of said evaporated water by increasing the pressure by blower or compressor (Mechanical Vapor Recompression) or a steam jet ejector (Thermal Vapor Recompression) or a combination thereof. Thereby the evaporated water vapor can be used as a heating medium for the evaporation in said evaporator, and said evaporator becomes very energy efficient as the latent heat of evaporation do not need to be supplied to said evaporation step. Preferably said evaporated fraction passes a demister and/or foam breaker prior to said vapor recompression. Said evaporator may advantageously be divided into two or more steps operating at a decreasing pressure and temperature, each heated with the evaporated vapor from the same vapor (in the case of vapor recompression) or the vapor from the foregoing step to minimize or further minimize the heat required for said evaporation.

Said evaporator may further comprise condensing said evaporated vapor in condensation steps, where the condensation temperatures in said condensation steps are selected so as to obtain a fractionation of the evaporated fraction, i.e. a fraction comprising water and eventually higher boiling compounds, and a fraction where compounds having a boiling point temperature lower than water are concentrated. It should be noted that said condensers according to the present invention may comprise heat exchangers where the media to be concentrated are evaporated on the other side, but in general said evaporation step according to the present invention comprises at least one additional condenser compared to the number of evaporation steps. The fraction comprising evaporated water ("distillate") may further be cooled to a temperature suitable for discharge in a cooler, 15. Hereby, it is obtained that said evaporator besides recovering said liquid organic compounds and/or homogenous catalysts also cleans and purifies the water phase in an efficient manner and produces a water phase that may be reused or discharged to recipient. Optionally the "distillate" may be subjected to one or more polishing steps, 16. Said polishing steps may include an absorber and/or adsorber and/or a coalescing step and/or membrane system and/or a biological treatment system such as bioreactor.

The fraction being concentrated with compounds having a boiling point lower than water may according to a preferred embodiment be mixed with the concentrate from said evaporator, and recycled to the pretreatment step 1.

Further, the preferred embodiment of the process according to the present invention discloses that $CO_2$ is recovered from the gas produced by the process.

A carbonaceous material from one or more feedstock is provided as a feed mixture according to the present invention and converted into a liquid hydrocarbon product in a continuous process by pressurizing the feed mixture to a pressure in the range 150-400 bar, and subsequently heating the feed mixture to a temperature in the range 300 to 450° C., and maintaining the feed mixture in the desired pressure and temperature range in a reaction zone for a predefined time. Subsequently the mixture containing converted carbonaceous material is cooled and expanded in one or more cooling and expansion steps to a temperature in the range 25-200° C., and a pressure in the range 1 to 70 bar.

The converted feed mixture is at least partly expanded in at least one flash separation step 11, wherein the converted feed mixture is separated into a gas phase and a liquid phase. The gas typically contains 60 to 95+% $CO_2$ by weight with the remainder being hydrogen, $C_1$-$C_4$ hydrocarbons and water. The gas is withdrawn from the top of the flash separator, and $CO_2$ is recovered from said gas phase.

It should be understood that the cooling and expanding may comprise a series of flash separators operating at different pressures and temperatures, e.g. a first flash separator may be operating at a temperature and pressure close to the reaction temperature and pressure and may result in a gas phase and liquid phase. Either phase may be further cooled, expanded and separated into further gas and liquid phases. According to an embodiment of the present invention $CO_2$ is recovered from said gas phase or combination of gases by cooling and expanding said gas phase under pressure to a final pressure below the critical pressure of $CO_2$ of 74 bar such as a pressure in the in the range 50 to 70 bar, and a final temperature below the critical temperature of $CO_2$ of 31° C. in one or more steps so as to condense and recover $CO_2$ as liquid $CO_2$.

As shown in FIG. 1, a preferred embodiment includes a flash separator or degasser 11 that separates said converted feed mixture into a gas phase comprising a substantial amount of $CO_2$ and a liquid phase. The flash separator or degasser is preferably operated at a pressure of 50-70 bar and a temperature in the range 100 to 200° C. The gas may be withdrawn from the top and cooled to a temperature in the range 35 to 80° C. such as a temperature in the range 35 to 50° C. in a first condenser 17, whereby a first condensate comprising water and/or other condensables such as methanol, ethanol and/or acetone are produced. The condensate is separated from the gas in the splitter 18 and preferably fed to the recovery unit for concentration and purification. The gas phase separated from said splitter 18 is further cooled to a temperature below the critical point of $CO_2$ of 31° C. in the second condenser 19. Preferably said gas exiting the first splitter is cooled to a temperature in the range 12-30° C. such as a temperature in the range 15-25° C., whereby $CO_2$ is condensed. $CO_2$ condensed by the cooling in the second condenser is separated from the residual gas in the second splitter 20. The liquid $CO_2$ recovered is fed to a storage tank. The liquid $CO_2$ produced may be used for production of algae or enhanced oil recovery etc. The residual gas may have a high calorific value and a high hydrogen content after said separation. According to the present invention, the calorific value of said residual gas may be above 20 MJ/kg such as above 25 MJ/kg, preferably said residual gas may have a calorific value above 30 MJ/kg such as above 35 MJ/kg, more preferred said gas may have a calorific value above 40 MJ/kg. The residual gas produced may according to the present invention be used for at least partly producing heat for heating of the process.

The hydrogen concentration in said residual gas may be more than 30% by volume such as a hydrogen concentration of more than 35% by volume, preferably the hydrogen concentration in said residual gas is above 40% by volume. The hydrogen rich residual gas may in another embodiment according to the present invention be used as a hydrogen source in an upgrading process for upgrading said liquid hydrocarbon as further described in relation to the following figures.

Figure 2:
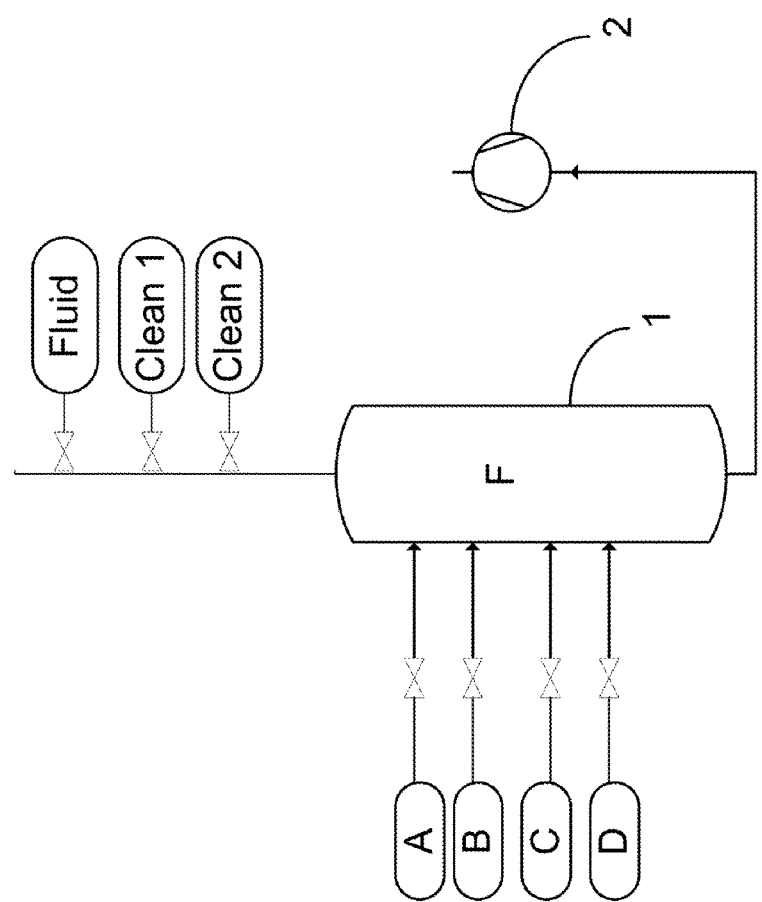
FIG. 2 shows a part of the production line shown in FIG. 1.

From FIG. 2 a part of the apparatus described in FIG. 1 is shown in more detail. It appears from FIG. 2 that apart from the inflow systems for the production scenario, i.e. the feed mixture, the catalyst and the base, a further number of inflows (fluid, clean1 and clean2) have been provided. The further inflows include fluid and two different cleaning agent inflows. Further inflow options may be provided. All inflows are controllable through valve arrangements 32, 33, 34, and all valves are controllable through a control system to be described in connection with FIG. 3.

The fluid used in the startup procedure is different from the feed mixture under normal operation conditions. The fluid often comprises water. Non limiting examples of preferred fluids include water, alcohols, oil or fractions of oil and mixtures thereof.

The heating is characterized by a substantial amount of heat added to said high pressure high temperature reaction zone substantially carried/transferred by said fluid.

The pressure during startup/shut down is according to the present invention maintained at a value higher than the corresponding saturation pressure at the prevailing temperature so as to maintain the fluid used during heat up on a liquid form.

Hence, according to a preferred embodiment of the present invention the pressure is maintained at a pressure of at least 10 bars higher than the corresponding saturation pressure such as at least 25 bars higher than the saturation pressure at the prevailing temperature in the process, preferably said pressure is maintained at least 50 bars higher than the saturation/boiling point pressure at the prevailing temperature such as at least 100 bars higher than the saturation/boiling point pressure at the prevailing temperature.

During a startup procedure the duration of said heating cycle corresponds to at least 3 exchanges of the volume in said high pressure high temperature part of the process such as at least 15 volume exchanges, preferably at least 10 volume exchanges such as at least 20 volume exchanges.

Figure 3:
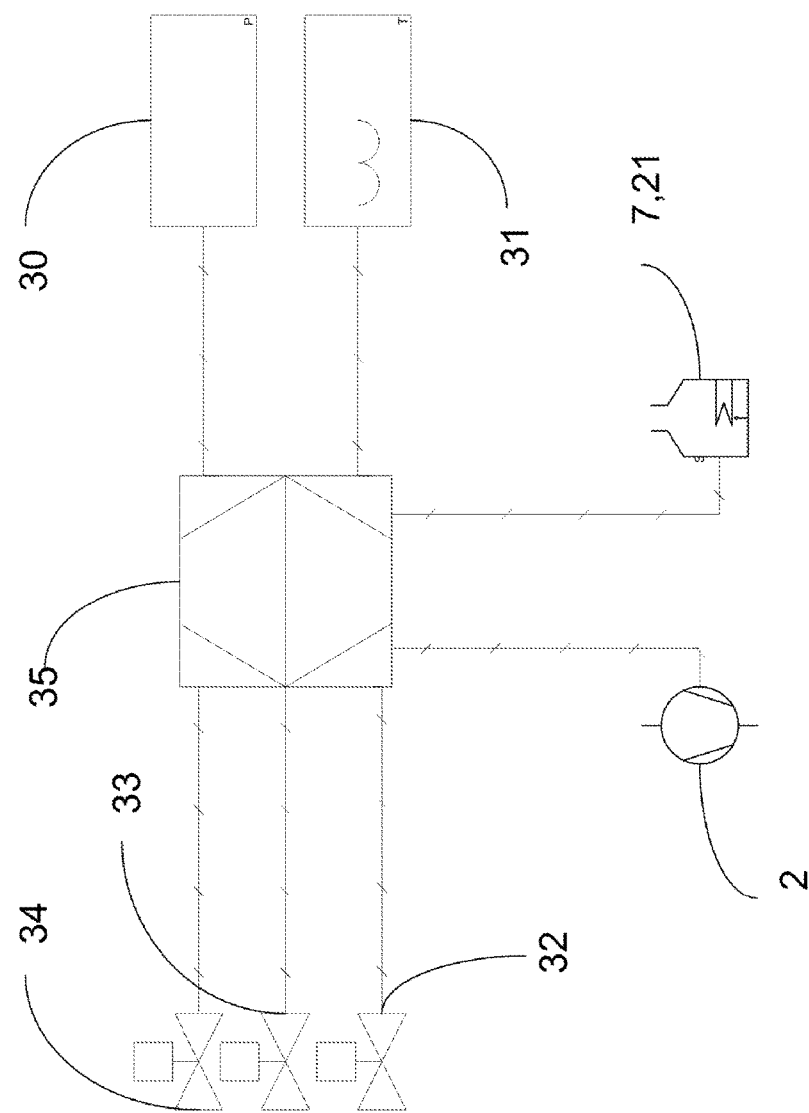
FIG. 3 shows schematically the part in FIG. 2 with attached control system.

From FIG. 3 a schematic control system appears. The control system comprises at least one, preferably more, temperature sensor(s) 31 and at least one, preferably more, pressure sensor(s) 30. The temperature and pressure sensors 30,31 provide an input to a central control unit 35, capable of providing control signals to valves 32,33,34, heater(s) 7,21 and compressor(s) 2. The control signals provided follows the specifications of the process according to the invention and may be calculated based on a suitable formula or may be based on values from look up tables specifying the corresponding values of input and output.

The control system is part of the apparatus according to the invention.

Figure 4:
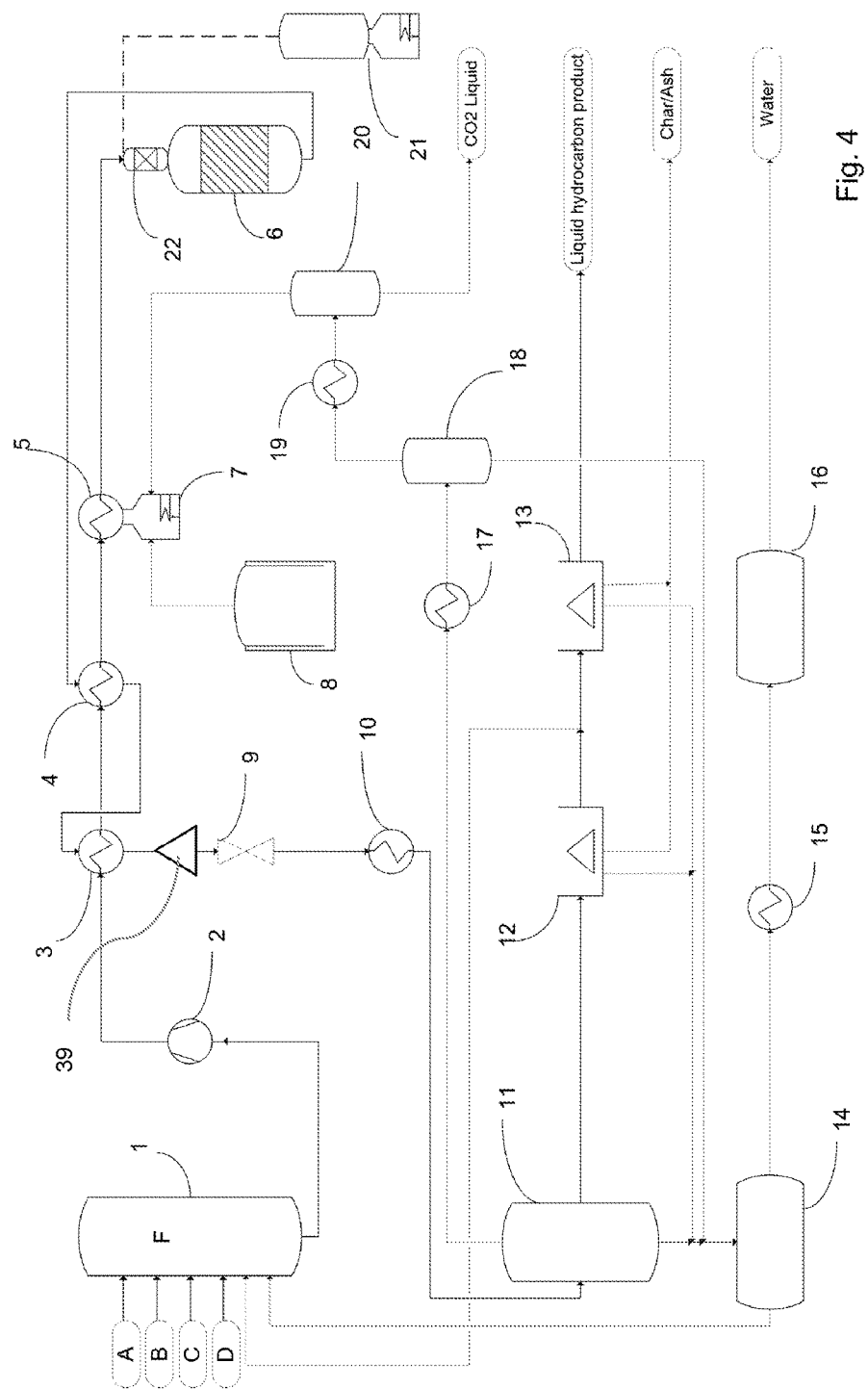
FIG. 4 shows a further embodiment of a production line for producing liquid hydrocarbon.

FIG. 4 shows another preferred embodiment of the invention, where part of the heating is performed by direct heating by injection of a super-heated fluid such as a supercritical fluid instead of or as an addition to heat addition by indirect heating as shown in FIG. 1. The super-heated or supercritical fluid is introduced into the feedstock/fluid in a mixing zone 22 subsequent to the second heater 5. The mixing zone 22 may according to the present invention constitute an integral part of the reactor 6. The super-heated or supercritical fluid being introduced into said mixing may comprise superheated supercritical water at a pressure and temperature higher than the desired reaction temperature for said conversion such as a pressure above 300 bar and a temperature above 450° C.

The super-heated or supercritical water may be provided by a supercritical boiler 21, which may optionally be at least partly fuelled by gas exiting the separator 20.

Figure 5:
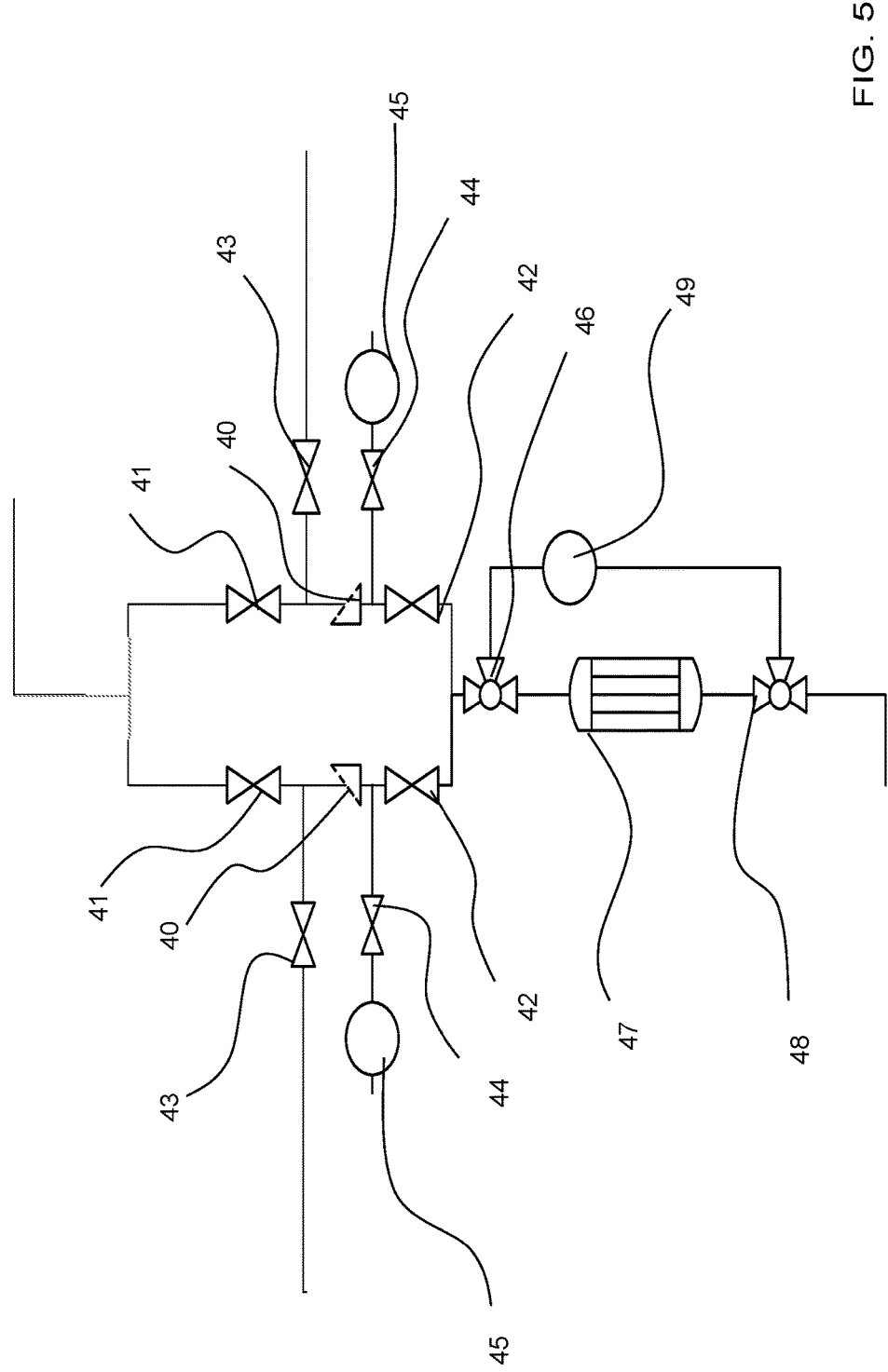
FIG. 5 shows schematically an arrangement of separation filters and valves allowing interchange of filters during cleaning and operation.

From FIG. 5 a schematic view of a pressure reduction unit appears, where the configuration of the pressure reduction devices and the connecting piping and valves are visible. The diameter of each tubular element of the pressure reduction device and further the length of these is determined according to process parameters, where the design criterium preferably is so that the average flow velocity in a tubular element is kept below 30 m/s, preferably even lower, e.g. 20 m/s or 10 m/s. Upstream of the pressure reduction devices a screen or filter 40 has been introduced in the flow system in order to filter out a high viscosity fraction of the processed material. A first valve 1 distributes the flow to further valves 2,3 through piping, where valves 2,3 each controls access to a string of pressure reduction devices, for valve 2 the pressure reduction devices 5,9, etc. and for valve 3 pressure reduction devices 10, etc. The valve 2 may additionally control access to additional strings available through valve 4. Valves 7,8 indicate that access to parallel pressure reduction devices may be available in case a need for maintenance exists for a particular pressure reduction device, where the access to such for that reason may need to be shut down. For example, in case pressure reduction device 5 is shut down through closure of valves 2,7, the flow may be directed to pressure reduction device 6 and back to pressure reduction device 9 for pressure reduction through operation of the valves 2,4,8,7. It appears that above and below the pressure reduction device 5 valves 11,12 are provided that connect a flushing system comprising a pump 13 and suitable piping connecting the pump to the valves. The flushing is preferably carried out in an opposite direction of the normal flow direction of the pressure reduction device as the main location of the obstruction to be removed normally is at the inlet of the tubular element(s) of the pressure reduction device. The flushing operation may be carried out when the pressure reduction device is closed out of the pressure reduction unit, i.e. when valves have closed the high pressure process system in relation to the pressure reduction device.

Upstream the pressure reduction device a number of mechanical filter units 40 are located, in this case two. Valves 41,42 are provided upstream and downstream each mechanical filter 40, allowing an open or closed condition of each filter. When the valves 41,42 are closed at operational pressure, the pressure will remain in the part of the system between the two valves 41,42. Further, a release valve 43 is provided, preferably upstream the filter 40. When opening this valve 43 the operational pressure reciding in the system between the two closed valves will force the filtered content out through the open release valve. A flushing pump 45 is provided separated from the filter chamber by a valve 44, which pump may flush the filter and piping for any remaining residues. Upon closing the release valve 43, the purpose of the flushing pump 45 is to fill the system around the filter 40 with a fluid, preferably water, before allowing opening of the system valves upstream and downstream the filter. Filling the filter chamber with a fluid will significantly reduce the pressure fluctuations that could be a result of pressurrising an airfilled chamber.

Having passed the filter, the low viscosity fraction enters the pressure reduction system. The pressure reduction takes place in the tubular system 47. Upstream and downstream the tubular system 47, valves 46, 48 are provided, which allow closing of the tubular system in relation to inflow and outflow, hereby providing a possibility for cleaning the tubular system using the flush pump 49. Other types of pressure reduction may be used in relation to the invention.

The invention claimed is:

1. Method for producing liquid hydrocarbon by converting carbonaceous material contained in one or more feedstocks, the method comprising
Providing a feed material;
Pressurizing the feed material to a predetermined process pressure of 150 to 400 bar;
Heating the pressurized feed material to a predetermined process temperature of 370 to 500° C.;
Reacting the pressurized and heated feed material for a predetermined period of time;
Cooling the reacted feed material to a temperature below 200° C.;
Mechanically separating the converted feed material at operational pressure into a higher viscosity fraction and a lower viscosity fraction, and extracting the higher viscosity fraction from the process through alternating mechanical filters between at least one online filter and at least one offline filter, the temperature of the filters being controlled to be in the range 40 to 200° C.; and
Conveying the remaining converted feed mass including the lower viscosity fraction through a pressure reduction system and further through a separation system.

2. Method according to claim 1, where the mechanically separated and extracted higher viscosity fraction is treated further.

3. Method according to claim 1, where the mechanically separated and extracted higher viscosity fraction is treated further.

4. Method according to claim 1, wherein the temperature of the filters is controlled to be 120 to 200° C. to selectively solidify high viscosity compounds.

5. Method according to claim 1, wherein temperature of the filters is controlled to be 40 to 60° C. to allow a lower viscosity fraction to permeate at a sufficiently high temperature for successive separation and possibly further processing.

6. Method according to claim 1, where a filter is made online and hereby opened for inflow and a filter is made offline and hereby closed for inflow by opening and closing, respectively, system valves upstream and downstream of the filter.

7. Method according to claim 6, where further a drain valve located between the closed system valves and upstream the filter element, is opened towards a lower pressure area, in order to release the mechanically separated higher viscosity fraction from the filter and through the drain valve.

8. Method according to claim 7, where the drain valve is opened towards surrounding environment pressure conditions.

9. Method according to claim 7, where the drain valve is closed and the chamber is filled with an essentially incompressible fluid prior to pressurizing the filter chamber through opening the system valves.

10. Device for carrying out the method according to claim 1, where the device comprises:
- a pump adapted for pressurizing a feed mixture;
- one or more heat exchangers adapted for heating the pressurized feed mixture;
- a conversion tank adapted for holding the pressurized and heated feed mixture for a predetermined process time;
- one or more heat exchangers adapted for at least partly cooling the processed feed mixture;
- a mechanical filter device adapted for separating the processed feed mixture into a higher viscosity fraction and a lower viscosity fraction, and allowing the lower viscosity fraction to pass through the filter device;
- one or more tubular elements through which flows the processed feed mixture having passed through the mechanical filter device, thereby causing the pressure of the processed feed mixture to decrease; and
- a mechanism adapted for separating the components of the processed feed mixture passed through mechanical filter device, said mechanism comprising at least one of a flash separator and one or more centrifuges.

11. Device according to claim 10, where the mechanical filter device is a filter with filter openings ranging between 0.1 µm and 1 mm.

12. Device according to claim 10, where system valves are located on upstream and downstream sides of the mechanical filter device.

13. Device according to claim 12, where a drain valve is located between the system valves.

14. Device according to claim 13, where the drain valve is located upstream the separation device.

15. Device according to claim 14, where a fluid supply valve is located between the system valves and adapted to allow inflow of a fluid when the system valves and the release valve are closed.

16. Device according to claim 14, where the fluid supply valve is located downstream the separation device.

17. Device according to claim 1, where a number of filters are provided in parallel a where system valves are provided upstream and downstream each of the filters.

* * * * *